US010599211B2

(12) United States Patent
Clement et al.

(10) Patent No.: US 10,599,211 B2
(45) Date of Patent: Mar. 24, 2020

(54) CONTEXT SENSITIVE HAND COLLISIONS IN VIRTUAL REALITY

(71) Applicant: GOOGLE INC., Mountain View, CA (US)

(72) Inventors: Manuel Christian Clement, Felton, CA (US); Alexander James Faaborg, Mountain View, CA (US); Rahul Garg, Sunnyvale, CA (US); Jonathan Tompson, Mountain View, CA (US); Shiqi Chen, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 125 days.

(21) Appl. No.: 15/228,594

(22) Filed: Aug. 4, 2016

(65) Prior Publication Data

US 2017/0038830 A1 Feb. 9, 2017

Related U.S. Application Data

(60) Provisional application No. 62/200,825, filed on Aug. 4, 2015.

(51) Int. Cl.
*G06F 3/01* (2006.01)
*G06F 3/0481* (2013.01)
(Continued)

(52) U.S. Cl.
CPC ............ *G06F 3/011* (2013.01); *A63F 13/212* (2014.09); *A63F 13/213* (2014.09);
(Continued)

(58) Field of Classification Search
CPC ............................. G06F 3/011; G06F 3/04847
See application file for complete search history.

(56) References Cited

U.S. PATENT DOCUMENTS 5,977,935 A * 11/1999 Yasukawa ............ G02B 27/017
340/980
6,141,015 A * 10/2000 Tanaka .................... G06T 19/20
345/424
(Continued)

FOREIGN PATENT DOCUMENTS

CN 103218041 A 7/2013
CN 103927002 A 7/2014
(Continued)

OTHER PUBLICATIONS

"Open sourced, gloveless, 6DOF hand/arm/finger tracking + gun for virtual Reality for less than $50 . . . ", FeelThree (http://www.feelthree.com/2014/09/6dof-handarmfinger-tracking), printed Apr. 13, 2015, 22 pages.
(Continued)

*Primary Examiner* — Nitin Patel
*Assistant Examiner* — Robert M Stone
(74) *Attorney, Agent, or Firm* — Brake Hughes Bellermann LLP

(57) ABSTRACT

In one aspect, a method and system are described for receiving input for a virtual user in a virtual environment. The input may be based on a plurality of movements performed by a user accessing the virtual environment. Based on the plurality of movements, the method and system can include detecting that at least one portion of the virtual user is within a threshold distance of a collision zone, the collision zone being associated with at least one virtual object. The method and system can also include selecting a collision mode for the virtual user based on the at least one portion and the at least one virtual object and dynamically modifying the virtual user based on the selected collision mode.

19 Claims, 7 Drawing Sheets

(51) Int. Cl.

| | | |
|---|---|---|
| *G06F 3/0485* | (2013.01) | |
| *A63F 13/428* | (2014.01) | |
| *G06F 3/0484* | (2013.01) | |
| *A63F 13/213* | (2014.01) | |
| *A63F 13/212* | (2014.01) | |
| *G06T 19/00* | (2011.01) | |
| *A63F 13/822* | (2014.01) | |
| *A63F 13/577* | (2014.01) | |
| *A63F 13/837* | (2014.01) | |

(52) U.S. Cl.
CPC .......... *A63F 13/428* (2014.09); *G06F 3/017* (2013.01); *G06F 3/0481* (2013.01); *G06F 3/0485* (2013.01); *G06F 3/04815* (2013.01); *G06T 19/006* (2013.01); *A63F 13/577* (2014.09); *A63F 13/822* (2014.09); *A63F 13/837* (2014.09)

(56) References Cited

U.S. PATENT DOCUMENTS

| | | | |
|---|---|---|---|
| 8,230,367 B2 | 7/2012 | Bell et al. | |
| 8,872,853 B2 | 10/2014 | Geisner et al. | |
| 9,122,311 B2* | 9/2015 | Galor | G09G 5/34 |
| 9,851,803 B2* | 12/2017 | Fisher | G02B 27/017 |
| 2004/0236541 A1* | 11/2004 | Kramer | G06T 19/20 |
| | | | 703/1 |
| 2005/0162402 A1* | 7/2005 | Watanachote | G06F 3/03547 |
| | | | 345/173 |
| 2009/0027337 A1* | 1/2009 | Hildreth | G06F 3/011 |
| | | | 345/158 |
| 2009/0147991 A1* | 6/2009 | Chau | A61F 4/00 |
| | | | 382/103 |
| 2009/0315839 A1* | 12/2009 | Wilson | G06F 17/5009 |
| | | | 345/173 |
| 2010/0053151 A1* | 3/2010 | Marti | G06F 3/011 |
| | | | 345/419 |
| 2010/0302145 A1* | 12/2010 | Langridge | G06F 3/011 |
| | | | 345/157 |
| 2011/0107216 A1* | 5/2011 | Bi | G06F 3/011 |
| | | | 715/716 |
| 2011/0191707 A1* | 8/2011 | Lee | G06F 3/011 |
| | | | 715/765 |
| 2012/0113223 A1* | 5/2012 | Hilliges | G06F 3/00 |
| | | | 348/46 |
| 2012/0157201 A1* | 6/2012 | Mizutani | G06F 3/017 |
| | | | 463/31 |
| 2012/0235912 A1* | 9/2012 | Laubach | G06F 3/04895 |
| | | | 345/163 |
| 2014/0104274 A1* | 4/2014 | Hilliges | G06F 3/011 |
| | | | 345/424 |
| 2014/0104320 A1* | 4/2014 | Davidson | G09G 5/32 |
| | | | 345/681 |
| 2014/0184496 A1* | 7/2014 | Gribetz | G02B 27/017 |
| | | | 345/156 |
| 2014/0198132 A1* | 7/2014 | Tsutsui | G06F 3/04842 |
| | | | 345/661 |
| 2014/0204002 A1* | 7/2014 | Bennet | G06F 3/011 |
| | | | 345/8 |
| 2015/0084866 A1* | 3/2015 | Thomas | G06F 3/03547 |
| | | | 345/158 |
| 2015/0130790 A1* | 5/2015 | Vasquez, II | G06T 19/006 |
| | | | 345/419 |
| 2015/0169176 A1* | 6/2015 | Cohen | G06F 3/04815 |
| | | | 715/852 |
| 2015/0258432 A1* | 9/2015 | Stafford | A63F 13/213 |
| | | | 463/32 |
| 2015/0338924 A1* | 11/2015 | Watanabe | G06F 3/017 |
| | | | 345/156 |
| 2015/0363996 A1* | 12/2015 | Keilwert | G07F 17/3211 |
| | | | 463/31 |
| 2016/0004320 A1* | 1/2016 | Lundberg | G06K 9/48 |
| | | | 345/633 |
| 2016/0018985 A1* | 1/2016 | Bennet | G06F 3/04886 |
| | | | 345/175 |
| 2016/0085379 A1* | 3/2016 | Cho | G06F 3/0426 |
| | | | 345/169 |
| 2016/0189427 A1* | 6/2016 | Wu | G06T 19/006 |
| | | | 345/633 |
| 2016/0316081 A1* | 10/2016 | Matsuki | G06F 3/12 |
| 2017/0160927 A1* | 6/2017 | Pate | G06F 3/021 |

FOREIGN PATENT DOCUMENTS

| | | | | |
|---|---|---|---|---|
| GB | 2534386 A | * | 7/2016 | ............ G06F 3/014 |
| WO | 2014/145166 A2 | | 9/2014 | |
| WO | WO-2016115976 A1 | * | 7/2016 | ........... G06F 3/0233 |

OTHER PUBLICATIONS

Johnson, "Leap Motion Hooks Up to Oculus for Controller-Free Virtual Reality", <Re/code> (http://on.recode.net/1vnj7VS), Aug. 28, 2014, 3 pages.

International Search Report and Written Opinion received for PCT Patent Application No. PCT/US2016/045568, dated Nov. 11, 2016, 16 pages.

Cashion, et al., "Automatic 3D Selection Technique Assignment Using Real-time Scenario Analysis", IEEE Virtual Reality, Mar. 16-20, 2013, pp. 103-104.

Argelaguet, et al., "A Survey of 3D Object Selection Techniques for Virtual Environments", Computers & Graphics, vol. 37, 2013, pp. 121-136.

Prachyabrued, et al., "Visual Feedback for Virtual Grasping", IEEE Symposium on 3D User Interfaces, Mar. 29-30, 2014, pp. 19-26.

* cited by examiner

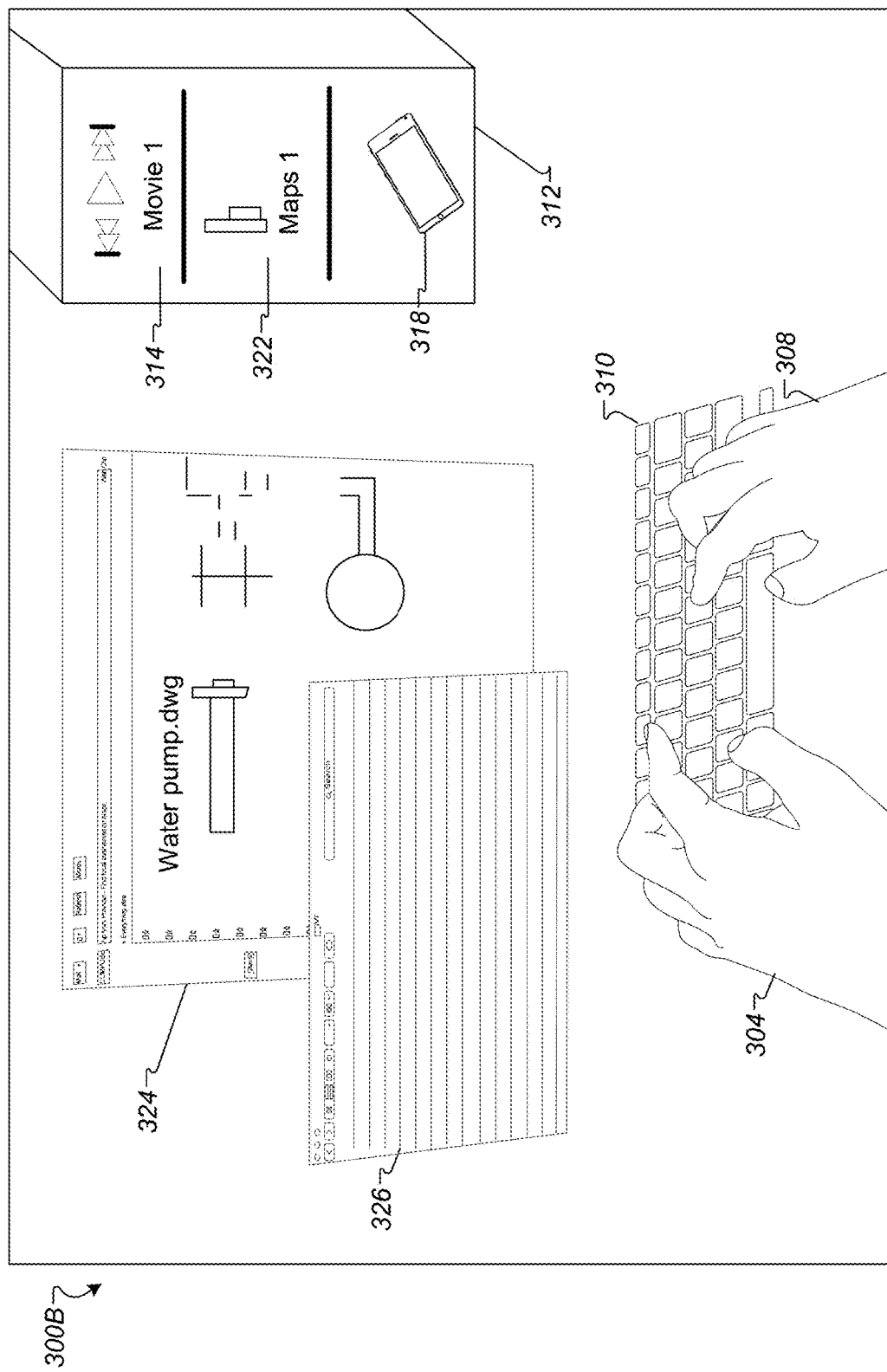

CONTEXT SENSITIVE HAND COLLISIONS IN VIRTUAL REALITY

CROSS-REFERENCE TO RELATED APPLICATION

This application claims priority to and the benefit of U.S. Patent Application Ser. No. 62/200,825, entitled "Context Sensitive Hand Collisions in Virtual Reality," filed on Aug. 4, 2015, the disclosure of which is incorporated herein by reference.

TECHNICAL FIELD

This description generally relates to the use of computing devices in a virtual reality (VR) environment. In particular, this description relates to techniques for handling collisions in a VR environment.

BACKGROUND

In general, virtual reality can surround and immerse a person in a computer-generated, three-dimensional (3D) environment. The person can enter this environment by interacting with and/or physically wearing specific electronic devices. Example electronic devices can include, but are not limited to, a helmet that includes a screen, glasses or goggles that a user looks through when viewing a screen (e.g., a display device or monitor), gloves fitted with sensors, and external handheld devices that include sensors. Once the person enters the VR environment, the person can interact with the 3D environment in a way (e.g., a physical way) that seems real to the person.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method includes a computer-implemented method. The method may include receiving input for a virtual user in a virtual environment. The input may be based on a plurality of movements performed by a user accessing the virtual environment. The method may also include detecting that at least one portion of the virtual user is within a threshold distance of a collision zone based on the plurality of movements. The collision zone may be associated with at least one virtual object. The method may also include selecting a collision mode for the virtual user based on the at least one portion and the at least one virtual object, and dynamically modifying the virtual user based on the selected collision mode. Other embodiments of this aspect include corresponding computer systems, apparatus, and computer programs recorded on one or more computer storage devices, each configured to perform the actions of the methods.

Implementations may include one or more of the following features. The method may also include adjusting the collision zone to align with the modified virtual user. The adjusting may include providing a plurality of viewable targets in the collision zone in which to receive the input. The plurality of viewable targets may be associated with the selected collision mode. The input may include a hover movement proximate to the at least one virtual object and the threshold distance includes about one half to about one inches from the at least one virtual object.

The method may also include determining that the virtual environment is providing scrollable content, selecting a palm-based collision mode, and configuring the content to be scrolled in response to receiving a palm gesture initiated by a hand of the user. Dynamically modifying the virtual user may include modifying a portion of the virtual user corresponding to providing input in the virtual environment. Modifying the portion may also include detecting that the input includes finger movements and the portion includes one or more virtual fingers, and extending a reach of the one or more virtual fingers into the collision zone. The extending may include adapting the virtual user to interact with a virtual object that is shown within a threshold distance to the one or more virtual fingers in the virtual environment. Dynamically modifying the virtual user may include providing at least one of a visual response, an audio response, or a haptic response to the user. The method may also include providing at least one context-sensitive collision zone based at least in part on the selected collision mode, where the collision mode is configured as a fine collision mode if the context of the collision zone is configured to receive finger gestures and where the collision mode is configured as a coarse collision mode if the context of the collision zone is configured to receive interactive hand gestures. The context-sensitive collision zone may be provided based on a size associated with the collision zone. The context-sensitive collision zone may be provided based on a size associated with the at least one virtual object in the virtual environment. Implementations of the described techniques may include hardware, a method or process, or computer software on a computer-accessible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including an electronic computing device generating a virtual reality experience in a virtual reality environment, the electronic computing device being portable within a physical space, a plurality of sensors in communication with the electronic computing device, the sensors configured to detect motion associated with a user accessing the electronic computing device within the physical space, and at least one processor. The processor may be configured to detect a movement in the virtual reality environment, the movement being performed by a physical user, the movement being represented in the virtual environment and associated with a body part of the physical user. In response to determining that the virtual object is configured to receive input in an area on the virtual object that is smaller than the body part, the system may be configured to select a collision mode to modify a selection capability with the body part. The at least one processor may be configured to display, on a representation of the body part in the virtual environment, the modified selection capability and maintain the selected collision mode until detecting movement associated with a different virtual object.

Implementations may include one or more of the following features. The processor may be configured to display, on a representation of the body part in the virtual environment, the modified selection capability includes configuring the body part to glow, vibrate, move, grow, or shrink, the display indicating to the physical user a mechanism in which to interact with the virtual object.

In some implementations, the virtual object is a keyboard, the body part is a hand, the collision mode is selected to shrink a fingertip area of the hand, and the representation of the body part includes an indicator on each finger. In some implementations, the collision mode is selected from the group consisting of a full hand mode, a whole arm mode, a finger mode, a whole body mode, and a keyboard mode, each mode including a fine and a coarse configuration.

Implementations of the described techniques may include hardware, a method or process, or computer software on a computer-accessible medium. In another general aspect, a non-transitory computer readable medium containing instructions that, when executed by a processor of a computer system, cause the computer system to receive input for a virtual user in a virtual environment, the input being based on a plurality of movements performed by a user accessing the virtual environment. The instructions may also include detecting that at least one portion of the virtual user is within a threshold distance of a collision zone based on the plurality of movements. The collision zone may be associated with at least one virtual object. The instructions may also include selecting a collision mode for the virtual user based on the at least one portion of the virtual user being within the threshold distance of the collision zone and dynamically modifying the virtual user based on the selected collision mode.

Implementations may include one or more of the following features. The instructions may include adjusting the collision zone to align with the modified virtual user. The adjusting may include providing a plurality of viewable targets in the collision zone in which to receive the input, the plurality of viewable targets being associated with the selected collision mode. In some implementations, the input includes a hover movement and the threshold distance includes about one half to about one inches from the at least one virtual object.

In some implementations, dynamically modifying the virtual user includes modifying a portion of the virtual user corresponding to providing input in the virtual environment. In some implementations, dynamically modifying the virtual user further includes detecting that the input includes finger movements and the portion includes one or more virtual fingers and extending a reach of the one or more virtual fingers into the collision zone. The extending may include adapting the virtual user to interact with a virtual object that is shown within a threshold distance to the one or more virtual fingers in the virtual environment.

The instructions may include providing at least one context-sensitive collision zone based at least in part on the selected collision mode. The collision mode may be configured as a fine collision mode if the context of the collision zone is configured to receive finger gestures and wherein the collision mode is configured as a coarse collision mode if the context of the collision zone is configured to receive interactive hand gestures. Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

FIGS. 3A-3C are diagrams that illustrate images that the user can view on a screen of a head-mounted display (HMD) device.

Like reference symbols in the various drawings indicate like elements.

DETAILED DESCRIPTION

A computer-generated virtual reality (VR) environment can create an immersive experience for a user by generating virtual space and virtual objects that allow the user to interact with (e.g., reach into) the virtual space as if to interact with physical objects. In general, the VR environment can provide a user with a number of mechanisms with which to interact with virtual space and virtual objects. The mechanisms can include physical devices configured to sense particular user movement, such as wearable items housing electronics (e.g., head mounted devices, gloves, bodysuits, ocular cameras, etc.), sensors, and other devices that allow the user to provide input into the VR environment. In some implementations, the user can lean (e.g., move) toward or into objects in the VR environment. Leaning can include some or all of a body part or portion. For example, a user can hover his hand near (within a threshold distance of) an object in the VR environment and system 100 can detect the hover/nearness of user's hand. Hovering may include pausing in the air proximate to an object as if being suspended in the air proximate (e.g., within a threshold distance) to the object for a threshold amount of time. Hovering can include a time-based component and a distance-based component. For example, a user can hover over a virtual object for about 1 to about 3 seconds of time and can hover within about one inch to about three inches from the virtual object. In general, the system can detect a hover and use the detected hover as a mechanism with which to trigger menus, actions, or output associated with particular objects within a threshold distance of the user's hand.

If the user wishes to interact with the VR environment, he or she may reach toward virtual objects in the VR environment using one or more fingers, hands, arms, feet, legs, and the like. Such a reach (e.g., movement) may be detected as input in which to simulate movement of virtual objects and modifications to the VR environment. In some implementations, portions of the user's body can be rendered for display in the VR environment and the systems and methods described herein can receive user input when the user moves such portions. The user input provided into the VR environment can be interpreted as collisions occurring between virtual objects and other rendered VR content or objects. The systems and methods described herein can be configured to detect such collisions and determine how the VR environment may respond to a user regarding the detected collisions. The response to detected collisions in the VR environment can include any combination of a visual response, an audio response, and/or a haptic response, as described in detail below.

Figure 1:
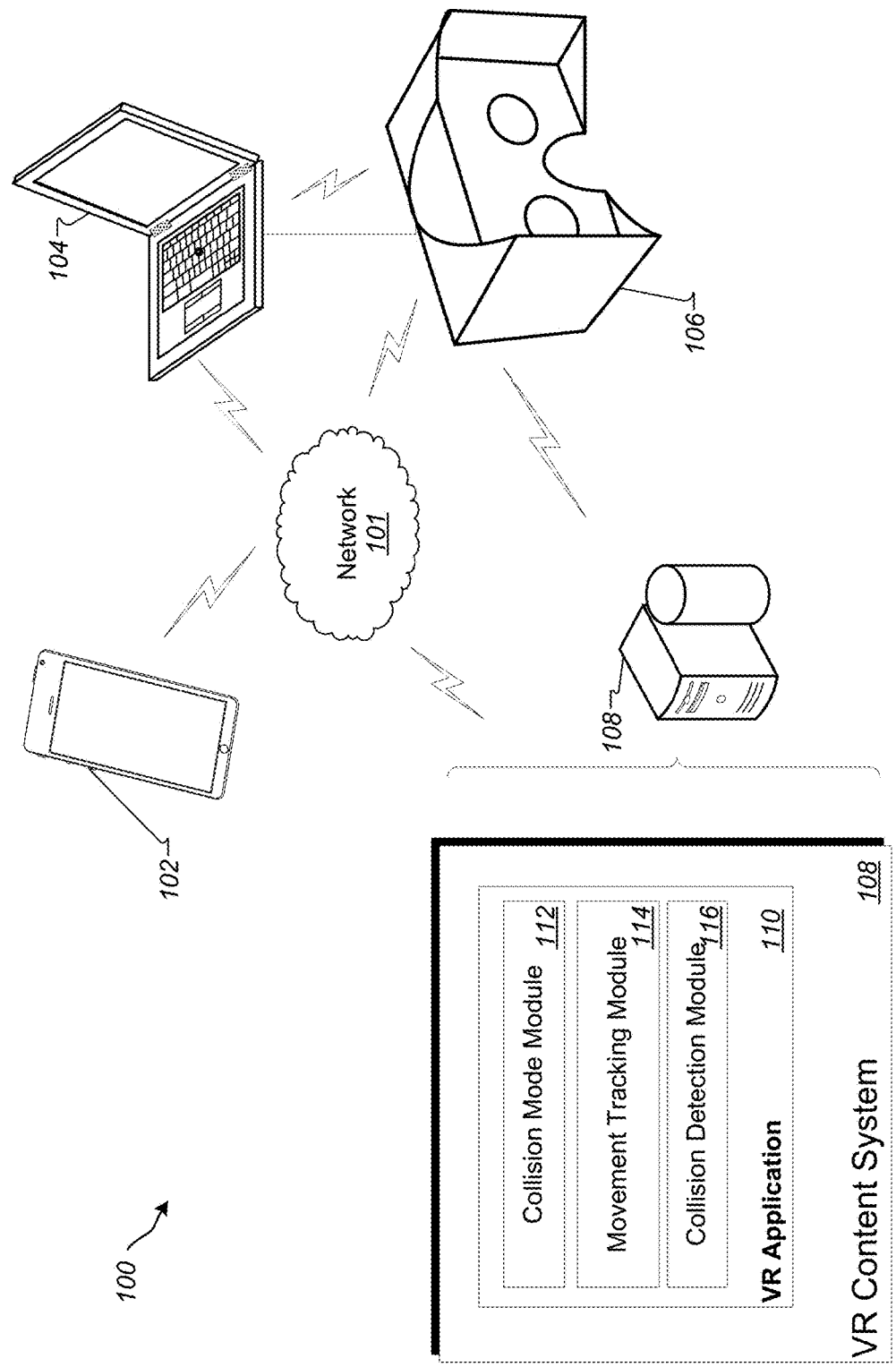
FIG. 1 is a block diagram of an example system providing context sensitive collision interaction in a 3D virtual reality (VR) environment

FIG. 1 is a block diagram of an example system 100 providing context sensitive collision interaction in a 3D virtual reality (VR) environment. In general, the system 100 may provide the 3D VR environment and VR content using the methods, components, and techniques described herein. In particular, system 100 can provide the user with intuitive responses to movements (e.g., interactions) associated with the user and/or virtual objects within the VR environment. In some implementations, the system 100 can modify portions of a virtual user based on which portion is selected (by a physical user) to interact with the VR environment. For example, a user may be interacting in the VR environment by reaching for and picking up blocks. The user may grab the blocks and stack the blocks. The user's fingers, palms, forearms, and possibly other arm or portions may trigger collisions and affect the physical world. This enables the user to accurately grab items in the hands of the user, or push the items with a realistic experience. System 100 can detect which portion is likely to interact with the (virtual) blocks first and can block other collisions with other body parts. In another example, the system 100 can extend the reach of the fingers and hands as they near the virtual blocks because the system 100 can detect that the user intends to collide with virtual objects using hands.

System 100 can be configured to provide a VR environment housing virtual objects with interactive and context-sensitive targets. As used herein, a target may refer to a control area for receiving input from a user. The control area can be any shape and size and can be modified by the VR environment depending on detected user input or context of how a user is interacting with the control area. The input may refer to physical user input such as a hand movement, a finger movement, or other physical movement through physical space, etc. The input may result in triggering movement in virtual objects in the VR environment, including interacting (e.g., colliding) with the virtual objects to move, modify, or otherwise affect some aspect of the virtual object. In response to detecting user input, the system 100 can perform an action associated with objects or content in the VR environment.

Context-sensitive targets can take into account a number of details about the user before performing an action associated with objects or content in the VR environment. For example, context-sensitive targets may be configured and/or operated based at least in part on user-specific information, user movement information, virtual object information, VR environment information, and/or other VR based information. The terms target and context-sensitive target may be used interchangeably throughout this disclosure and either term may apply to context-sensitive targets.

In general, targets can be selected by a user controlling movements (e.g., as a rendered virtual user) in the VR environment. The systems and methods described herein can also be configured to dynamically modify the rendered user, in response to detecting a portion of the rendered user near or on a target. For example, when the user begins to lean (e.g., hover) toward a virtual object (associated with one or more targets) presented in the VR environment, the system 100 can detect the movement and display a number of selectable areas (e.g., targets) within the VR environment that the user can pass through to trigger immediate or near immediate action (e.g., functionality). In particular, in response to determining a collision may be about to occur, the system 100 can respond by providing one or more context-sensitive targets and/or by dynamically modifying portions of the rendered user (or other item performing selections in the VR environment) to assist the user in selecting a context-sensitive target.

The dynamic modifications can be performed by system 100 to allow precise selection of targets. In some implementations, the dynamic modifications can be performed by system 100 to indicate to a user which portion of the user's body part (or other virtual object associated with user input) is configured to interact with the VR environment. For example, as the user reaches into the VR environment toward a target, the system 100 may determine which portion of the body part (e.g., finger, whole hand, palm, elbow, foot, etc.) is likely to collide with the target, and can dynamically provide a visual, audio, or haptic effect on the determined portion. This can ensure that the user understands which portion of the user's body will be making a selection (or performing an action) in the VR environment. In addition, the system 100 can dynamically modify a portion of a body part to ensure the portion can interact with (e.g., reach) fine small targets. For example, the system 100 could extend and narrow a rendered index finger of the virtual user to ensure the index finger collides with a small target before any other portion of the user's hand collides with the target. In another example, the system 100 can broaden a rendered hand of the virtual user to mimic a broad hand swipe that can be used to move large objects in the VR environment. In particular, a large target may be triggered to switch between applications on a screen in the VR environment. The trigger for the large target may be five fingers and a swipe across the application. If the user uses four fingers because he is missing a digit or one digit is not in line with the other digits, the system 100 can detect the missing or misaligned digit and can broaden the hand swipe in order to trigger the target to switch applications.

In general, the system 100 can analyze user interactions in the VR environment to determine a context for particular collisions between the virtual objects and the user (as the user is rendered in the VR environment). The detection can be used to provide the user with a response that is directed to a desired intent for the user. For example, when the user attempts to grasp (e.g., reaches for) a virtual object with a hand, the hand begins to approach a user interface surface that can react in a number of different ways. The system 100 can determine which (VR environment-based) reaction matches the intent for the user and can react according to that intent.

For example, the system 100 can be configured to react to an extended hand of the user (or other user-based interaction) and the reaction can be based at least in part on the direction of the extended hand, the virtual object being reached for by the hand, the size of the virtual object, or other factor relevant to the VR environment. In this example, as the user (or user's hand) approaches the user interface surface, the systems and methods herein may determine whether precise object selection or less precise object selection is appropriate for the virtual object. In particular, if the virtual object is typically associated with precise, tactile interaction and control, such as a floating keyboard or a list of items in a menu, the system 100 can dynamically modify at least one portion of the user's hand to ensure the hand can properly activate the intended virtual object collision. For example, the user may be typing on a keyboard in the VR environment and system 100 can provide visual, audio, or haptic feedback to the user as the user types on the keyboard. In a non-limiting example, as the user types, each finger that contacts the keyboard can be made to glow before and during contact. Similarly, the system 100 can provide a click or vibration to the user's finger each time the user selects a key on the keyboard.

In some implementations, the system 100 may be configured to provide feedback to the user before or during collisions to avoid a scenario in which the user reaches an entire hand into a target and along the way, a finger collides/triggers one or more targets in which the user did not intend to collide. This scenario may be due, in part, to distances in VR interactions being difficult to judge accurately by the user. In addition, malfunctions (loss of accuracy) of a hand tracking system can occur if sensors fail or are negatively affected by environmental settings (e.g., lighting, spacial distortion, etc.). The system 100 can dynamically modify rendered objects (e.g., users) and virtual objects and associated virtual content to provide feedback to the user to avoid providing a frustrating user experience, a loss of a sense of presence, a decrease of perceived product excellence, and to avoid possible data loss or other measurable negative consequence for the user.

The example system 100 includes a plurality of computing devices that can exchange data over a network 101. The devices may represent clients or servers and can communicate via network 101, or other network. The client devices may include a gaming device or control, a mobile device, an electronic tablet, a laptop, a camera, VR glasses, or other such electronic device that may be used to access VR content.

As shown in FIG. 1, the system 100 includes a mobile device 102, a laptop computing device 104, a head mounted display (HMD) device 106, and VR content system 108. Devices 102, 104, and 106 may represent client devices. Mobile device 102, computing device 104, and HMD device 106 can include one or more processors and one or more memory devices. The devices 102-106 can execute a client operating system and one or more client applications that can access, control, and/or display VR content on a display device included in each respective device, or in a connected device.

The VR content system 108 may represent a server device. In general, VR content system 108 may include any number of repositories storing content and/or virtual reality software modules that can generate, modify, or execute virtual reality scenes. In the depicted example, VR content system 108 includes a VR application 110 that can access content and/or controls for system 108. In some implementations, VR application 110 can run locally on one or more of devices 102-106. The VR application 110 can be configured to execute on any or all of devices 102, 104, 106, and 108.

The HMD device 106 may represent a virtual reality headset, glasses, eyepiece, or other wearable device capable of displaying virtual reality content. In operation, the HMD device 106 can execute a VR application, which can playback received and/or processed images to a user. In some implementations, the VR application 110 can be hosted by one or more of the devices 102, 104, 106, or 108, shown in FIG. 1.

In some implementations, the mobile device 102 can be placed and/or located within the HMD device 106. The mobile device 102 can include a display device that can be used as the screen for the HMD device 106. The mobile device 102 can include hardware and/or software for executing the VR application 110.

Additional devices are possible and such devices may be configured to be substituted for one another. In some implementations, the devices 102, 104, 106, and 108 can be laptop or desktop computers, smartphones, personal digital assistants, portable media players, tablet computers, gaming devices, or other appropriate computing devices that can communicate, using the network 101, with other computing devices or computer systems.

In the example system 100, the HMD device 106 can be connected to device 102 or device 104 to access VR content on VR content system 108, for example. Device 102 or 104 can be connected (wired or wirelessly) to HMD device 106, which can provide VR content for display.

In the event that the HMD device is wirelessly connected to device 102 or device 104, the connection may include use of one or more of the high-speed wireless communication protocols described herein. In the event that the HMD device 106 is wired to device 102 or 104, the wired connection can include a cable with an appropriate connector on either end for plugging into device 102 or device 104. For example, the cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors. Similarly, the wired connection can include a cable with an appropriate connector on either end for plugging into the HMD device 106 and device 102 or device 104. For example, the cable can include a Universal Serial Bus (USB) connector on both ends. The USB connectors can be the same USB type connector or the USB connectors can each be a different type of USB connector.

In some implementations, one or more content servers (e.g., VR content system 108) and one or more computer-readable storage devices can communicate with the computing devices 102, 104, 106 using network 101 to provide VR content to the devices 102-106. In some implementations, the network 101 can be a public communications network (e.g., the Internet, cellular data network, dialup modems over a telephone network) or a private communications network (e.g., private LAN, leased lines). In some implementations, the computing devices 102-108 can communicate with the network 101 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

In some implementations, the mobile device 102 can execute the VR application 110 and provide the content for the VR environment. In some implementations, the laptop computing device can execute the VR application 110 and can provide content from one or more content servers (e.g., VR content system 108). The one or more content servers and one or more computer-readable storage devices can communicate with the mobile device 102 and/or laptop computing device 104 using the network 101 to provide content for display in HMD device 106.

As shown in FIG. 1, the VR application 110 includes a collision mode module 112, a movement tracking module, 114, and a collision detection module 116. The collision mode module 112 can represent a software module that selects a collision mode for particular targets (e.g., selectable controls) within the VR environment. The collision mode module 112 can determine which collision mode may be appropriate for a user in a VR environment, based at least in part on the content being accessed and the environment being presented. In some implementations, the collision mode can be selected by collision mode module 112 based on an input type (e.g., keyboard, hands, gaming control, stylus, mobile device, body part, or other renderable object). In some implementations, the collision mode can be dynamically selected upon detecting a user input (with collision detection module 116, for example).

In some implementations, there may exist a large amount of possible collision modes, each of which can vary based on the proximity of a user to interactive objects, or based on the type of VR environment that the user is rendered within. Collision modes can be fine or coarse. Example collision modes can include, but are not limited to a full hand mode, a whole arm mode, one or more finger modes, a whole body mode, and a keyboard mode, any and all of which can also include sub-modes that provide narrower or wider collision zones. For example, an index finger mode may be configured to slightly modify the shape of a virtual user finger in order to accurately select virtual objects. In some implementations, the shape change may not be visible to the user, but the portion of the virtual user finger that is configured to collide with objects may have a smaller active area on the finger that can collide with objects. The smaller active area may trigger a fine collision mode in which the finger is adapted to easily select virtual objects that the user encounters. A collision mode may be understood as a mode that determines, inter alia, the level of detail, in the sense of subtlety and scale, and the granularity at which a virtual user can interact with a virtual object.

In a non-limiting example, a collision mode may be adapted for small area selection (e.g., keys, menu items, or detailed virtual object manipulation) or large area selection (e.g., lifting objects, moving blocks or other virtual content, drawing in virtual space, etc.). The collision mode module 112 can configure portions of the virtual user (e.g., the index finger) to engage with the virtual object in an appropriate way based on the context of interacting with small or large targets or small or large virtual objects. In some implementations, a particular collision mode can be modified for specific content. For example, if the user accesses interactive Yoga content in the VR environment, the user may be prompted to use a knee, a foot, shoulder, or inhale breath to perform particular selections and movements within the VR environment.

In another non-limiting example, a fine collision mode may be triggered if a user's hands are detected in a location on or proximate (e.g., hovering near) one or more virtual buttons on a virtual object or menu. The fine collision mode can indicate to the user that she should make collisions or (e.g., virtual object selections) using one or more fingers. For example, the collision mode module 112 may modify the virtual user's index finger to indicate that the fine collision mode is triggered and that the user should use an index finger to make selections (e.g., click virtual buttons). In some implementations and in addition to triggering button clicks with an index finger, the collision mode module 112 can allow users to move a scrollable region with the palm center of their hands. For example, the collision mode module 112 can determine that the virtual environment is providing scrollable content and in response, can select a palm-based collision mode. Selecting a palm-based collision mode may include configuring the content to be scrolled in response to receiving a palm gesture initiated by a hand of the user. In addition, selecting a palm-based collision mode may include modifying portions of the hand other than the palm to be ineffective. This can allow the user to use a palm to scroll and/or select, but if a finger inadvertently interacts with a collision zone, the module 112 can block (e.g., mute) the finger selection since the palm-based mode is the only active collision mode for performing scrolling in this example.

Similarly, if the collision detection module 116 detects that the user is nearing a virtual slider bar, the collision mode module can switch to a coarse collision mode and can indicate to the user to use a palm to move the slider bar. Such indications for a collision mode can include marking a portion of the virtual body that is likely to work well with a selected collision mode. For example, the virtual body portion can glow, vibrate, move, grow, shrink, or otherwise indicate to the user a mechanism in which to operate in the VR environment.

In another non-limiting example, the collision detection module 116 may detect that a user is engaged in a target practice game with shoot-able targets placed within the VR environment. When a hand of the user (e.g., rendered user controlled by a physical user's hand) nears a shoot-able target, the collision mode module 112 can indicate that an interactive collision mode may begin. For example, if module 112 detects proximity within a threshold distance to a target, the palm of the closest hand may dictate a particular collision mode. The mode may be a shooting mode and the indication may be a glow or other visual, audial, or tactile response to have the user close a palm and reopen the palm. Upon closing and reopening of the palm, a virtual object (such as a bullet) can be shot at the target. The indication to perform the gesture can trigger a particular collision mode that enables the palm of the user to reach the target with the virtual bullet. The collision mode enables the movement by enabling a gesture that allows for the cross-room movement of a bullet from the hand to the target.

In general, the system 100 can be configured to display small targets (e.g., controls) so that the user can view content without being encumbered by targets. The collision mode module 112 can be configured to detect when a user is within a threshold distance of a target and can change the target to accommodate the user's input mechanism as the user approaches the target. For example, the collision mode module 112 can dynamically change a user's arm into a spear or stylus that can point at a virtual object and be able to select a target that appears smaller than the user's finger. This can reduce the likelihood of the user selecting multiple targets or unwanted targets.

In some implementations, the system 100 can enable densely positioned sets of interactive user interface controls, virtual objects, and/or targets within an area and can provide accuracy of hand interactions for a user. This is because the ability to dynamically alter a rendered body part (e.g., hand) for the user can provide the ability for a larger user-performed movement to be altered into a finer movement for purposes of selecting finer targets and/or controls in the VR environment. The system 100 can provide content to the user in the environment without changing the sizes of the content, but can dynamically modify targets associated with the content so that any selection is automatically a more precise selection without the user having to change a behavior (or view). In one example, the system 100 can dynamically alter a rendering of a user's finger to ensure the user can precisely select small font in a particular menu provided in the VR environment. In this example, the alteration to the finger may or may not be visually shown to the user. However, upon interacting with the content in the VR environment, the user may notice a finer ability to select content because the system 100 has performed modifications on collision modes associated with the environment.

For example, the system 100 can perform particular modifications on collision modes in response to one or more threshold conditions being satisfied corresponding to user actions or movements. In one example, the system 100 can perform a modification of collision mode based on determining that a distance between hands of the user and objects in the VR environment is within a threshold distance (predetermined by the system 100). If the hands and the object are close, the system 100 can switch the collision mode to a fine control collision mode. Similarly, if the hands and object are far apart, the system 100 can switch to a coarse control collision mode.

In another example, the system 100 can determine whether a particular number of objects in the VR environment are in a range of proximity to each other. For example, the system 100 can determine when objects in the VR environment are densely spaced and in response, can switch the collision mode into a fine collision mode. Similarly, if the objects are sparsely spaced, the system 100 can switch to a coarse collision mode (or another mode in between fine and coarse control collision modes based at least in part on system determinations).

In another example, the system 100 can determine whether the user is slowing (e.g., decelerating) as the user is approaching VR objects. If the user is determined to be decelerating, the system 100 can switch to a fine control collision mode. Similarly, if the user is determined to be accelerating by VR objects, the system may switch to a coarse control collision mode or remove collision modes entirely until the user begins to decelerate into particular VR objects or areas.

In one non-limiting example, if the user is in a VR environment and wishes to interact with the user's hands with a virtually rendered phone, she can reach toward the virtual phone and begin pressing buttons. Because the user's hands (e.g., fingers, palm, etc.) are being tracked (by system 100), the phone can receive the user input and react accordingly. However, before the user interacts, the collision mode module 112 may determine that interacting with a virtual phone may involve fine motor skills with pinpoint selection capabilities. As such, the collision mode module 112 can determine that small targets should be provided to the user since the phone buttons are typically small, but the module 112 can also ensure that a particular collision mode is selected. In this case, since the selectable targets on the phone are provided as small targets, the collision mode module 112 may select a collision mode in which the user's tracked hands are shown smaller. In another example, the collision mode module 112 can select a collision mode in which the user's tracked hands are shown faded or dimmed, with the exception of a portion of the hand that indicates which body part will be interacting. That is, the module 112 can highlight or otherwise indicate to the user that a finger or fingertip will be the selection mechanism. In this example, should the user bump a target with a portion of the hand that is not indicated as the selection mechanism, the system 100 can be configured not to react to the inadvertent user motion.

The movement tracking module 114 can represent a software module that can detect and track speed and accuracy of a user moving near targets. For example, the movement tracking module 114 can interface with physical devices configured to sense user movement, such as wearable items configured with electronics (e.g., head mounted devices, gloves, bodysuits, ocular cameras, etc.), sensors, and other devices that allow the user to provide input into the VR environment. Interfacing to such devices can allow movement tracking module 114 to determine which targets may be triggered and in what order the targets should trigger, in the event that multiple targets are triggered. In some implementations, the movement tracking module 114 can track user movements to provide targets at appropriate timing intervals, such as when a user is within a threshold distance of such targets. In this fashion, the movement tracking module 114 can work with collision detection module 116 to provide a number of targets to a user at user-desired times and according to user-based contexts.

The collision detection module 116 can represent a software module that can perform geometrical and spatial analyses to detect collisions or near collisions in the VR environment and provide feedback to one or more other modules in VR application 110. In general, collisions can be determined either intentional or unintentional. Unintentional collisions can be predicted by movement tracking module 114 and collision detection module 116, in response to user movement, and such predictions can be provided to collision mode module 112 as a basis for changing a particular collision mode. For example, in response to detecting a user's entire palm coming toward a bookshelf with movement tracking module 114, the collision detection module 116 can ascertain that the user is reaching for one of many books on the bookshelf and can determine that many collisions may unintentionally occur if the palm of the user's hand is used as the selection mechanism. The collision detection module 116 can predict that a finger would be a better selection mechanism and can provide this information to the collision mode module 112. The collision mode module 112 can use this information to select a collision mode that would suit the VR interaction. In this fashion, the collision detection module 116 can determine a context and a resulting selection mechanism that would best suit a particular VR interaction. The context can be used to provide targets of a particular size, provide input mechanism of a particular type, and to ensure that user input is not unintentionally interpreted or inaccurately performed.

In operation, the VR application 110 can detect, with movement tracking module 114 and collision detection module 116, that the user is moving a hand into or near (within a threshold distance of) a target area. In response, the application 110 can determine a context for what the user is doing and can use that context to trigger a particular target/collision mode using collision mode module 112. For example, the VR application 110 (using collision mode module 112) can generally determine whether particular user interactions in the VR environment are more suited to a particular mode/model of triggering and can dynamically select and present the particular mode based on the determinations. The dynamic selection and presentation of such target modes can be performed before a user activates a target, for example. In a non-limiting example, a first mode can be selected in response to determining a first threshold condition has been met (e.g., a first distance from a target area is detected). If instead a second larger distance from the target area is detected, a second mode can be selected based on a second threshold condition of a larger distance from the user to a target area.

In some implementations, the system 100 may include an electronic computing device (e.g., device 106) generating a virtual reality experience in a virtual reality environment. The electronic computing device may be portable within a physical space. In some implementations, the electronic computing device may be communicatively coupled to any number of other computing devices (e.g., device 102, 104, 108, or other device not shown in FIG. 1).

The electronic computing device can include or have access to a plurality of sensors in communication with the electronic computing device. The sensors may be configured to detect motion associated with a user accessing the electronic computing device within the physical space. The electronic computing device can include one or more processors configured to detect a movement proximate to a virtual object in the virtual reality environment. The movement may be performed by a physical user and the movement may be represented in the virtual environment and associated with a body part of the physical user. For example, the movement may be a hand wave near a scrollable menu and the hand wave can be simulated as if the virtual user performed the move. The user's hand, arm or entire body can be represented in the virtual environment.

In response to determining that the virtual object is configured to receive input in an area on the virtual object that is smaller than the body part, the system 100 can select a collision mode to modify a selection capability with the body part. For example, the system 100 can determine to select a coarse collision mode in which a palm can make scrolling movements to scroll through a menu and the palm (or other configured body part can make selections). In one example, a coarse collision mode is selected for scrolling. Upon detecting that the user is not scrolling and/or when the scroll stops, the system 100 can switch to a fine collision mode to allow the user to select items in the menu using a finger. The system 100 can display, on a representation of the body part in the virtual environment, a modified selection capability. The modified selection capability may include configuring the body part to glow, vibrate, move, grow, or shrink, the display indicating to the physical user a mechanism in which to interact with the virtual object. The system 100 can maintain the selected collision mode until detecting movement associated with a different virtual object or a different interaction with the virtual object. For example, if the system moves a hand into another collision zone, the system 100 can change the collision mode to be associated with the new collision zone. The new collision zone can correspond to different collision modes and the system 100 can change to one or more of the different collision modes upon detection of being in the new zone.

In one example, if the virtual object is a keyboard and the body part is a hand, the collision mode may be selected to shrink a fingertip area of the hand, and the representation of the body part may include an indicator on each finger. In some implementations, collision modes can be selected any of a full hand mode, a whole arm mode, a finger mode, a whole body mode, and/or a keyboard mode. Each mode may include both a fine and a coarse configuration for each mode.

Figure 2:
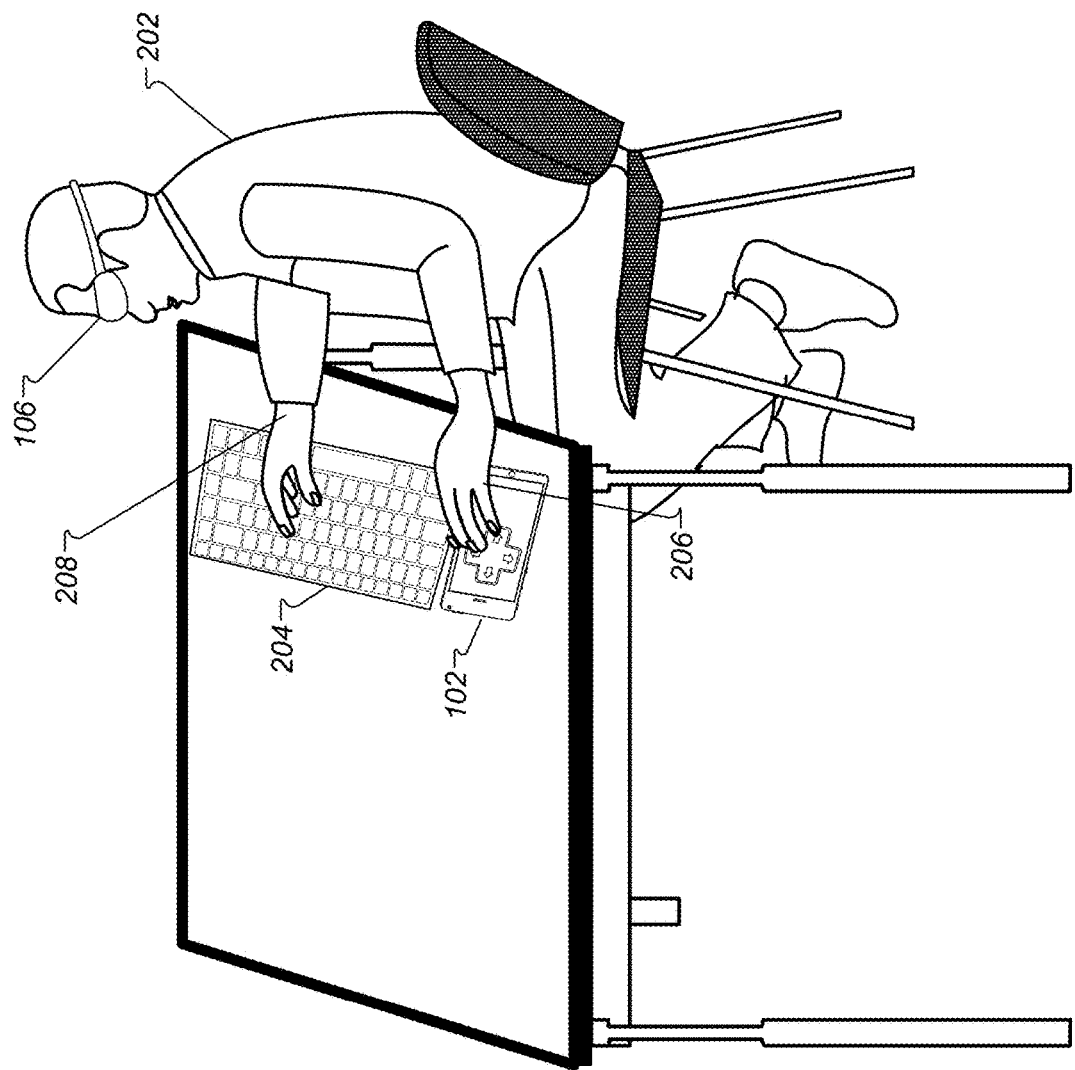
FIG. 2 is a diagram that illustrates a user interacting with a computing device.

FIG. 2 is a diagram that illustrates a user 202 interacting with a computing device 104. For example, the computing device 104 can include a keyboard 204. The user 202 may also be using a mobile device 102. Other devices can be used by user 202 and such devices can be connected to HMD device 106, mobile device 102, and/or keyboard 204. The user 202 can view the displayed content associated with the computer system 104 on a screen of the HMD device 106, while interacting with the keyboard 204 and/or mobile device 102. The HMD device 106 can be connected to (e.g., interfaced to) the computing device 104 using one or more of the wired and/or wireless communication interfaces described herein.

The user 202 can interact with the computing device 104 and the keyboard 204 when controlling actions performed in the VR environment. For example, the keyboard 204 can be rendered in the VR environment as VR controls that may be displayed to the user 202. The user 202 may interact with the computing device 104 in the VR environment by moving, rotating, and/or waving at the controls to trigger targets associated with the controls. The user shown in FIG. 2 is typing on a keyboard with his hands 206 and 208 while accessing HMD device 106. HMD device 106 is showing the user 202 a number of rendered objects in the following FIGS. 3A-3C. The user's hands 206 and 208 are shown as rendered hands 304, and 306a/b), respectively.

Figure 3A:
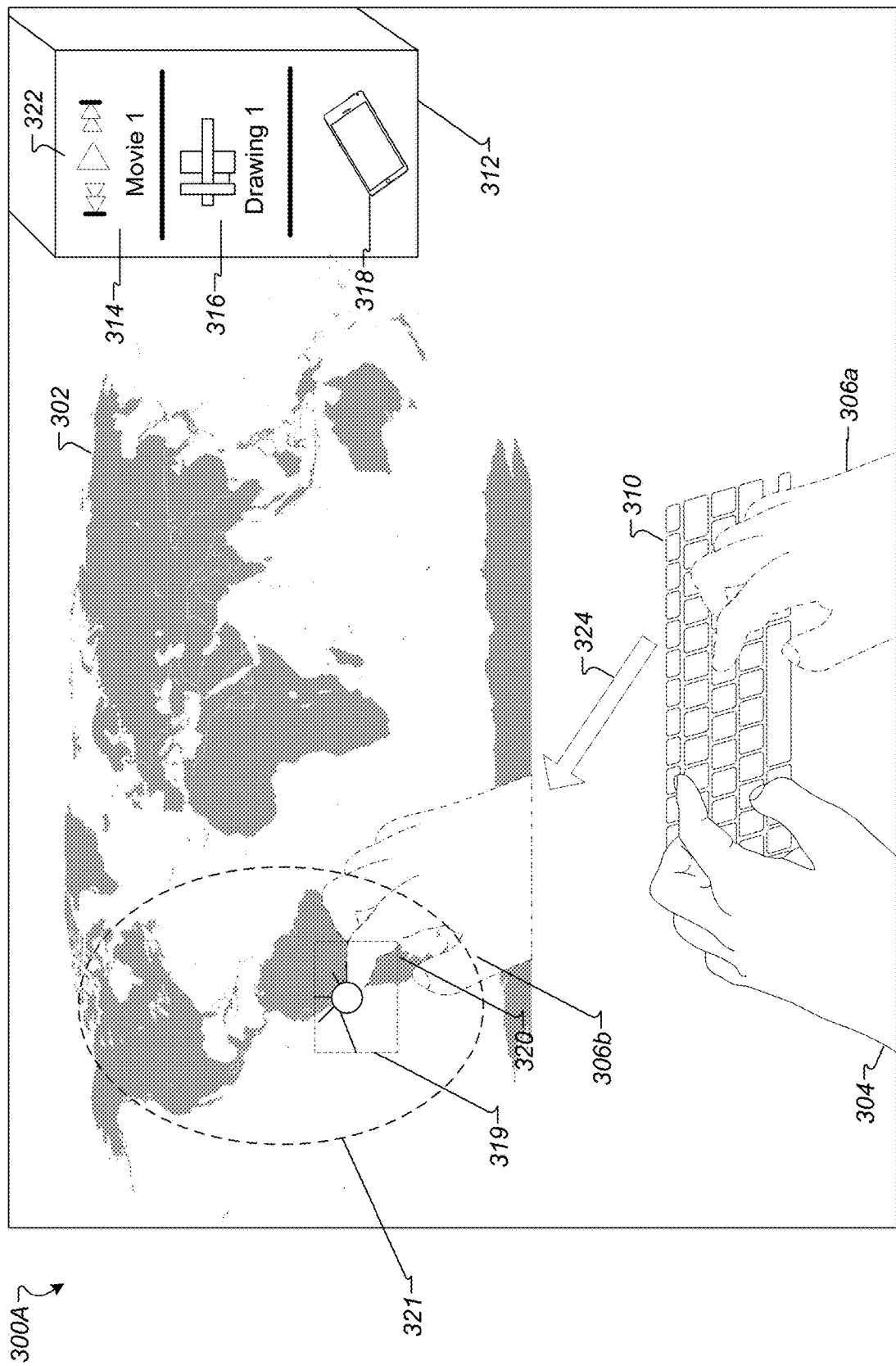
Figure 3C:
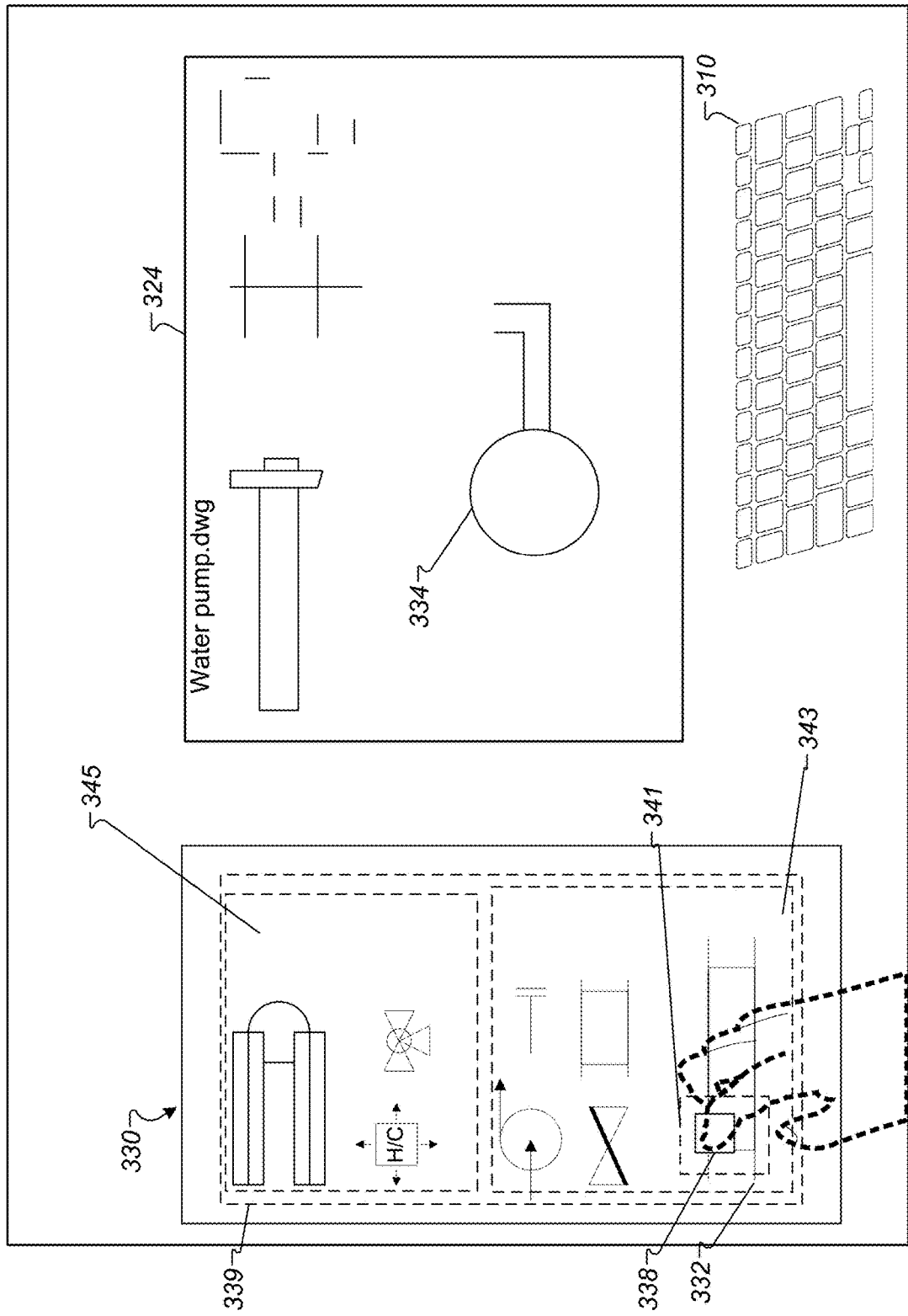

FIGS. 3A-3C are diagrams that illustrate images that the user (e.g., user 202 from FIG. 2) can view on a screen of the HMD device 106. For example, the image 300A projects the user 202 into a VR environment. The image 300A includes a rendering 302 of the map information displayed on a display device and a rendering 304, 306a, and 306b of hands and fingers of the user 202 interacting with a rendering 310 of the keyboard 204. In this example, hand 306a is a virtual rendering of a first placement of the user's right hand (corresponding to hand 206) and hand 306b is a virtual rendering of a second placement of the user's right hand (corresponding to hand 208). In addition, other windows that may be alternately displayed (e.g., rendered) as the user 202 interacts with the computing device 104 (e.g., rendered control window 312) and presented to the user 202 in the VR environment along with the rendering 302 of the information.

The control window 312 depicts three selectable areas, namely movie area 314, drawing area 316, and mobile device area 318. Movie area 314 corresponds to a movie that the user 202 has previously accessed in the environment. That is, the user may have been watching a movie and may have chosen to switch to accessing map information 302. Similarly, user 202 may have been accessing a CAD drawing by selecting drawing area 316 or mobile device interaction using mobile device area 318.

As shown in FIG. 3A, the rendered hands 304 and 306a of the user 202 may be typing information into a rendered screen (not shown) using rendered keyboard 310. At some point, the user 202 can use a (rendered) hand to interact with rendered map information 302. For example, the user 202 (represented by rendered hand 306a) can reach out to select content on the map. Here, the user 202 may wish to select the country of Chile to trigger additional information and/or content. The user 202 can reach his rendered hand 306a toward the map (as indicated by arrow 324 and into map information 302 (as shown on the map by the dotted line rendered hand 306b). In response, the VR application 110 can determine that the user 202 is reaching toward South America on the map and can trigger one or more collision modes and/or target displays. For example, the VR application 110 can determine that the user 202 is using one or both (rendered) hand as an input mechanism and as such, the application 110 can trigger a collision mode that enables the user's finger as a selector and can provide a visual display when the user is within a collision zone 319 at a target 320 (e.g., glow/shimmer at target 320) to indicate to the user that the finger can perform a map selection. In some implementations, a larger collision zone 321 may be triggered before the smaller collision zone 319 is triggered. In some implementations, the larger collision zone 321 may be triggered if the user is using a palm selection mode to interact with virtual content. In other implementations, the smaller collision zone 319 may be triggered if the user is using a fingertip to interact with the virtual content.

The rendered hand 306b may be visible, but dimmed and the tip of the user's index finger on hand 306b can function as a collider with map information 302. Providing a collision mode can ensure that the user does not accidentally select multiple unintended locations on the map. The selected collision mode can define that particular targets are as large as the user's rendered finger so that the user can touch an intended target, but ensure that unintended targets are not selected.

In another example, the map information 302 may be displayed as part of a trivial pursuit game provided in the VR environment. The game may include instructions for selecting a continent in response to each question. Since selecting an entire continent in map information 302 may involve a palm-sized swipe or selection, the VR application 110 (using collision mode module 112) can determine that large targets and coarse collision may suffice and accordingly, a full hand selection collision mode can be configured and enabled. The VR application 110 can indicate to the user that a full rendered hand can be used for selection, by outlining the hand, providing a glow to the entire hand, providing haptic feedback to the palm via a glove on the hand of user 202, for example, or other interaction providing an indication to the user for how to select virtual objects.

In another example, the user 202 may be accessing map information 302 and may decide to switch back to a movie previously accessed (shown at movie area 314). The user 202 can select (with rendered hand 306a, for example) the play control 322 to switch to continue watching a movie in the VR environment. Since the play, fast forward, and rewind controls in control window 312 may be small, the VR application 110 can determine that small targets will be used in that area. In such a fashion, two distinct collision modes can be configured and provided in a single scene/interaction area.

In some implementations, the VR application 110 can dynamically modify the user's hand or finger to ensure the user can accurately select controls. For example, if the user 202 were watching a movie and her mobile device began ringing, the user 202 could reach for pause, triggering a fine pitched modification to the user's finger to account for the small target. A fine pitched modification can include a narrowing and/or extending a reach of a finger reaching to select the mobile device. In one example, the narrowing and/or extending can be displayed to the user. In another example, the narrowing or extending can be provided by enabling a hover over the mobile device to trigger selection of the fine pitched modification. The selection can automatically enable improved precision and/or reach of the user's finger by indicating one or more targets (or sparks) when the user is within a threshold distance of a rendered mobile device, for example. This provides an advantage of allowing the user to view that the reach is within range of the target without the user having to actually collide with the target.

In some implementations, to select mobile device functionality (shown at 318), the VR application can modify the user's finger to enable easy selection of a large target at 318 and then can subsequently and dynamically modify the user's finger to enable finer and smaller selection for buttons on the mobile device. This can allow the user to take a call, without inadvertently selecting virtual content placed between the movie area 314 and the mobile device area 318.

In short, the VR application 110 can detect an incoming call and can dynamically modify any or all user interfaces necessary to receive input in order to switch applications and/or take the call. The input can include pausing, exiting, or otherwise modifying an active VR environment scene, as well as any input used to switch to another VR environment scene or activity. The modifications can ensure that the user can select particular virtual items without interference. The dynamic modification may include ensuring that only an index finger may be configured to make selections in control window 312, for example. In some implementations, the user interface, collision mode, or virtual object can be modified based on elements in the VR environment, user input mechanism, and/or content being accessed, etc.

In some implementations, the collision mode can be predefined for particular content by a developer of the virtual content. In some implementations, the collision mode may be selected or configurable based on a distance from a virtual object. In some implementations, the collision mode may be selected or configurable based on a sensed hand size or input mechanism size. In some implementations, the collision mode can be selected by a VR user based on particular needs. For example, if the user wishes to begin interacting with VR content in a full hand mode until mastering use of a new control, for example, the user can select full hand mode and can configure the mode to a finger mode or other mode upon being ready to do so.

In some implementations, collision modes can be configured differently for hands belonging to the user. For example, if both hands are in front of the user in a VR environment, the left hand may be configured to select or hand wave at large targets and/or large tiled objects while the right hand may be configured to select precise controls and may include visually smaller portions or lengthened portions of the hand.

In some implementations, one or more collision modes can be configured to accommodate disabilities associated with the user. For example, if the user is missing a portion of an index finger, the VR application 110 can account for the missing portion by shrinking the other three fingers to ensure that the index finger provides the selection and that the other three fingers do not encounter a virtual object before the index finger. Similar modifications can be made for other body parts based on missing portions.

In some implementations, the VR application 110 can account for user movement impairments. For example, if the user suffers from a tremor on one arm, the VR application 110 can compensate by dampening the user movement, as far as the VR environment detects and interprets such movement.

In some implementations, a combination of collision modes can be used in one VR environment. The combination of collision modes can be based on having a combination of small and large selectable targets within the VR environment. The collision mode may be selected for each interaction type or alternatively on a per session, a per game, per content, or per user basis. In addition, collision modes can be configured to provide particular sounds to alert a user to boundaries of entering target areas or triggering the targets.

FIG. 3B is a diagram that illustrates an image 300B that the user 202 can view on a screen of the HMD device 106. In this example, the user 202 may have been watching a movie (by selecting movie area 314) of control window 312. At some point, the user may decide to switch to a CAD drawing activity and may do so by selecting drawing area 316 (FIG. 3A). In response to selecting area 316, the user 202 may be placed into his VR drawing program in which he was beginning to draft a water pump drawing for his employer, as shown by rendered window 324. A second rendered window 326 is depicted and can also be selected and/or moved by user 202 within the VR environment.

FIG. 3B also depicts projection of user 202 into the VR environment by way of rendered hands 304 and 308 on a rendered keyboard 310, similar to FIG. 3A. In general, the image 300B includes information that can be displayed on a display device and renderings of the user 202 interacting with content using the rendered keyboard 310. In this example, the user may wish to modify the drawing shown at rendering 324. To do so, the user can select rendering 324 with rendered hand 308, for example, to put the user into a VR environment that allows hands on drawing design, as shown in FIG. 3C.

FIG. 3C includes the rendering 324 with selectable drawing parts 330. In this example, the user 202 may wish to add a bell coupling 332 to rendering 324 at object 334 (shown from a side view). To do so, the user 202 can select the bell coupling 332 by reaching her virtual hand rendering 336 into the parts 330. In this fashion, the user can view a rendering of her hand 336 and the rendering may be dotted or dimmed while the selection mechanism (e.g., the fingertip at target/spark 338) may be solid, glowing, or otherwise visually indicating to the user, information about which body part is selecting the drawing. The target/spark 338 may be within a collision zone 339. Collision zone 339 may represent all of selectable parts 330 or a portion of parts 330. Because the entire hand may inadvertently select other items in the drawing parts 330, the VR application 110 can invoke a collision mode to allow fingertip precision selection of items in the parts 330.

In some implementations, when a user's hand approaches a small target (e.g., menu, list, small object, etc.), the VR application 110 can dynamically change the collision mode to a fine or small target collision mode such that the index finger of the user is the only collision mechanism that will trigger the small target. In this fashion, the VR application 110 may dynamically modify a portion of the index finger that is selecting the small target. Although the VR application 110 is modifying the index finger in the VR environment to make selection more precise, the application 110 may not actually display the modification. Accordingly, the user may view the finger without modification.

In some implementations, collision zones can be nested within other collision zones. This can enable multiple collision modes for the same virtual content. For example, if the user 336 moves into collision zone 343, the system 100 may detect the movement and enable a hand/palm collision mode of part selection. As the user enters collision zone 341 to select part 332, a collision mode for selecting the part may be triggered and in response, the system 100 may detect the proximity or entrance into collision zone 341 and can change the collision mode from a hand/palm collision mode to a fingertip collision mode. Similarly, if the user 336 were to next hover over collision zone 345, the system 100 can change the collision mode from fingertip collision mode to hand/palm collision mode. Although collision zones are depicted square or rectangular, any size and shape of collision zone is possible. In general, a collision zone can be a volume (e.g., a sphere, a square, a rectangle, a polygon, or some other two dimensional or three dimensional shape) on or around a virtual object.

In some implementations, the collision mode can be selected to be a combination of two or more modes over time. For example, the collision mode can begin in a coarse mode and gradually switch to a fine mode. This gradual switch can be performed as VR environments are changed, such as when a user is switching tasks or walking around in different environments. In other implementations, the switch from one collision mode to another may be instantaneous upon changing tasks, environments, selection mechanisms, etc.

In some implementations, the VR application 110 can detect when a user wishes to touch particular items and can switch a collision mode based on this detection. For example, eye gaze can be detected for a user and the eye gaze direction can be used as input for determining what the user's actions may be (in context to where the user is looking). The VR application 110 can use the detected (intended) actions of the user can determine which collision mode may provide adequate responsiveness.

In some implementations, providing switchable collision modes can provide the advantage of preventing the loss of information or inadvertent confirmations or replies made by mistake. That is, switching a collision mode from a coarse mode to a fine mode can prevent a user from inadvertently deleting data or selecting too many items, etc.

In some implementations, system 100 can include VR equipment with sensors and/or software controls that can be used to turn collision modes on or off. For example, the HMD device 106 may include a button for cycling through a menu of available collision modes. The user can also use such a menu to turn off all collision modes, for example, if the user wishes to not interact in the VR environment. For example, if the user is in a museum and accessing VR content available at the museum, the user may not wish to accidentally disturb exhibits. Accordingly, the user can access the VR content, but choose not to interact with the content to prevent colliding with the world.

In some implementations, collision modes can be selected or toggled using voice control, gestures, physical button selections, or any combination thereof. In one example, the user may call out a voice command to activate or deactivate a particular collision mode. The voice commands may pertain to the VR environment itself or may pertain to virtual content accessed within the VR environment.

In some implementations, the system 100 can measure user biometrics (e.g. stress level, dermic response, fingerprint, heart rate, breathing, etc.) to select particular collision modes. For example, the system 100 can detect if a user is hesitating as the user approach a set of targets. The system 100 can suggest or dynamically switch to a collision mode based on the detection. That is, the system 100 may infer that the user may benefit from more precision in the VR environment, and as such, the system 100 can limit some collision modes, while freely providing other collision modes.

In some implementations, collision modes can be modified for a user based on a tracked history of user actions. For example, the system 100 can detect that the user repeatedly attempted to select pause during a movie and to do so the user moved back and forth incorrectly selecting targets while hesitating between targets. The user may have selected a rewind target and reselected a play target to undo the incorrect selection. In this case, the system can change the collision mode to provide a finer collision mode for the user's selection mechanism (i.e., the user's finger).

In another example, the user may intend to dial a friend using a mobile device in the VR environment, but instead, the user repeatedly dialed a cousin and hung up the mobile device. The system 100 can detect that the user's finger is crossing a path or that the VR equipment is out of calibration for a particular user and in response, the system can switch to a finer collision mode to make selection easier for the user. This can function to improve the user's perception of the VR environment and product.

In some implementations, collision modes can be saved between VR sessions. For example, the user can configure the collision modes to be saved remotely such that if the user accesses VR content in another headset or HMD device, the user can work in similar collision modes that she is accustomed to. Sensor equipment settings and software settings can also be carried with the user in a similar fashion.

In some implementations, the VR application 110 can be configured to provide a large number of targets and collision modes for a particular VR environment. However, providing all of the modes and targets at once can cause many errors based on triggering as the user walks around the VR environment. Accordingly, the VR application 110 can detect the user as she is walking and can turn off particular collision modes or targets to prevent unnecessary triggering or to prevent user confusion. For example, if the floor of a VR environment includes many targets and the user's feet are configured as the collision mechanism for certain levels of a game, the user may walk around unknowingly and trigger the targets on the floor. The VR environment may be configured to allow hand interactions in low levels of the game until particular levels are passed and then the floor may be provided with targets. The VR application 110 can determine the level that the user is playing and can activate or deactivate targets and/or collision modes based on the level.

In some implementations, a user may interact with a computing device in the VR environment in the same way that they may interact with the computing device in non-VR environment (e.g., in a standard, typical way). For example, the user may use an application on the computing device in VR environment as they would normally use the same application in non-VR environment.

In some implementations, a computing device can be rendered in a VR environment in its entirety. In some implementations, certain aspects of a computing device can be rendered in a VR environment. For example, a touch surface of a touchscreen of the computing device may be rendered in a VR environment. In another example, a border of the computing device may be rendered in a VR environment. In another example, an interface for the computing device (e.g., input controls) may be rendered in a VR environment.

Figure 4:
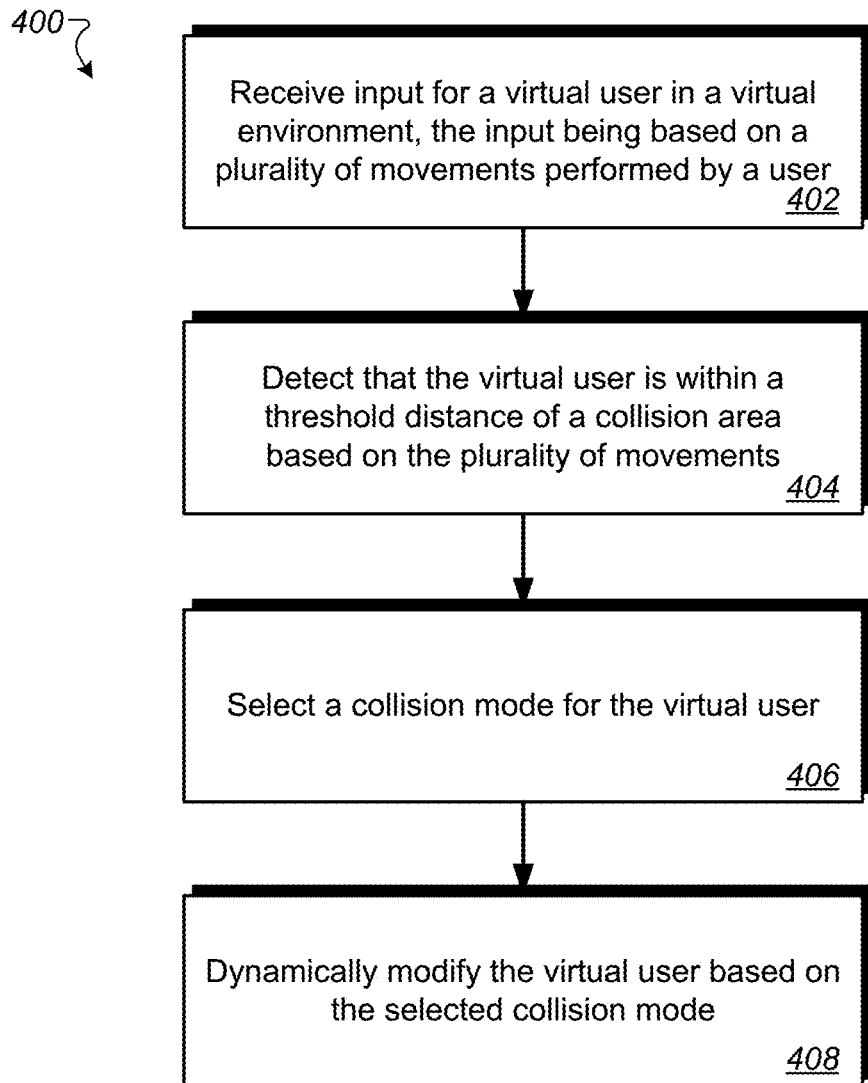
FIG. 4 is a flow chart diagramming one embodiment of a process to provide context sensitive collisions in a VR environment.

FIG. 4 is a flow chart diagramming one embodiment of a process 400 to provide context sensitive collisions in a VR environment. At block 402, the VR application 110 can receive input for a virtual user in a virtual environment. For example, the application 110 can receive a number of movements performed by a user that is being tracked in the VR environment. The movements may be based on hand gestures or arm or hand movements made in response to VR content being provided to the user in the VR environment. In some implementations, the movements may be based on objects or rendered content that the user can hold and move within the VR environment.

At block 404, the VR application 110 can detect that the virtual user (or an object held by the virtual user) is within a threshold distance of a collision zone based on the user's movements. In some implementations, the VR application 110 in combination with any number of sensors can detect that a portion of the user is within a threshold distances of a collision zone. The threshold distance can include a hover of the hand proximate to the virtual object, for example, performed about one half to one inch from the virtual object. For example, if the user 202 reaches his hand into a virtual object that is configured to be stacked on other virtual objects, the VR application 110 can detect that the user is about to collide with the virtual object and can respond by triggering a target area on the virtual object and/or on the user. That way, the user can visually see which portion of his hand will be used as a selector and which (target) area to select the virtual object.

At block 406, the VR application 110 can perform collision processing to select a collision mode for the virtual user and/or the collision zone. For example, the VR application 110 in combination with any number of sensors can analyze the portion of the user about to collide, the virtual object, and/or the physical or VR environment to select a collision mode appropriate for the combination.

At block 408, the VR application 110 can dynamically modify the virtual user based on the selected collision mode. In some implementations, dynamically modifying the virtual user can include modifying a portion of the virtual user corresponding to providing input in the virtual environment. In some implementations, dynamically modifying the virtual user may include providing at least one of a visual response, an audio response, or a haptic response to the user.

In some implementations, the VR application 110 can also include adjusting a collision zone to align with the dynamically modified virtual user. For example, the adjusting may include providing, a number of viewable targets in the collision zone in which to receive the input. The plurality of viewable targets may be selected and provided on the virtual object based on the virtual object being configured and/or associated with a particular collision mode. In some implementations, the VR application 110 can also provide at least one context-sensitive collision zone based at least in part on the selected collision mode. The context-sensitive collision zone may be provided based on a size associated with the collision zone. The context-sensitive collision zone may be provided based on virtual objects in the virtual environment.

In some implementations, modifying a portion of the user may include (i) detecting that the user input includes finger movements of the physical user and the portion of the user within a threshold distances of a collision zone includes one or more virtual fingers and (ii) extending a reach of the one or more virtual fingers into the collision zone in which the extending includes adapting the virtual user to interact with a virtual object that is shown proximate to the one or more virtual fingers in the virtual environment. In some implementations, dynamically modifying the virtual user includes providing at least one of a visual response, an audio response, or a haptic response to the user, as described throughout this disclosure.

In some implementations, the process 400 may also include providing at least one context-sensitive collision zone based at least in part on the selected collision mode. The collision mode may be configured as a fine collision mode if the context of the collision zone is configured to receive finger gestures. The collision mode may be configured as a coarse collision mode if the context of the collision zone is configured to receive interactive hand gestures. In some implementations, the context-sensitive collision zone is provided based on a size associated with the collision zone. In some implementations, the context-sensitive collision zone is provided based on a size associated with the at least one virtual object in the virtual environment.

Figure 5:
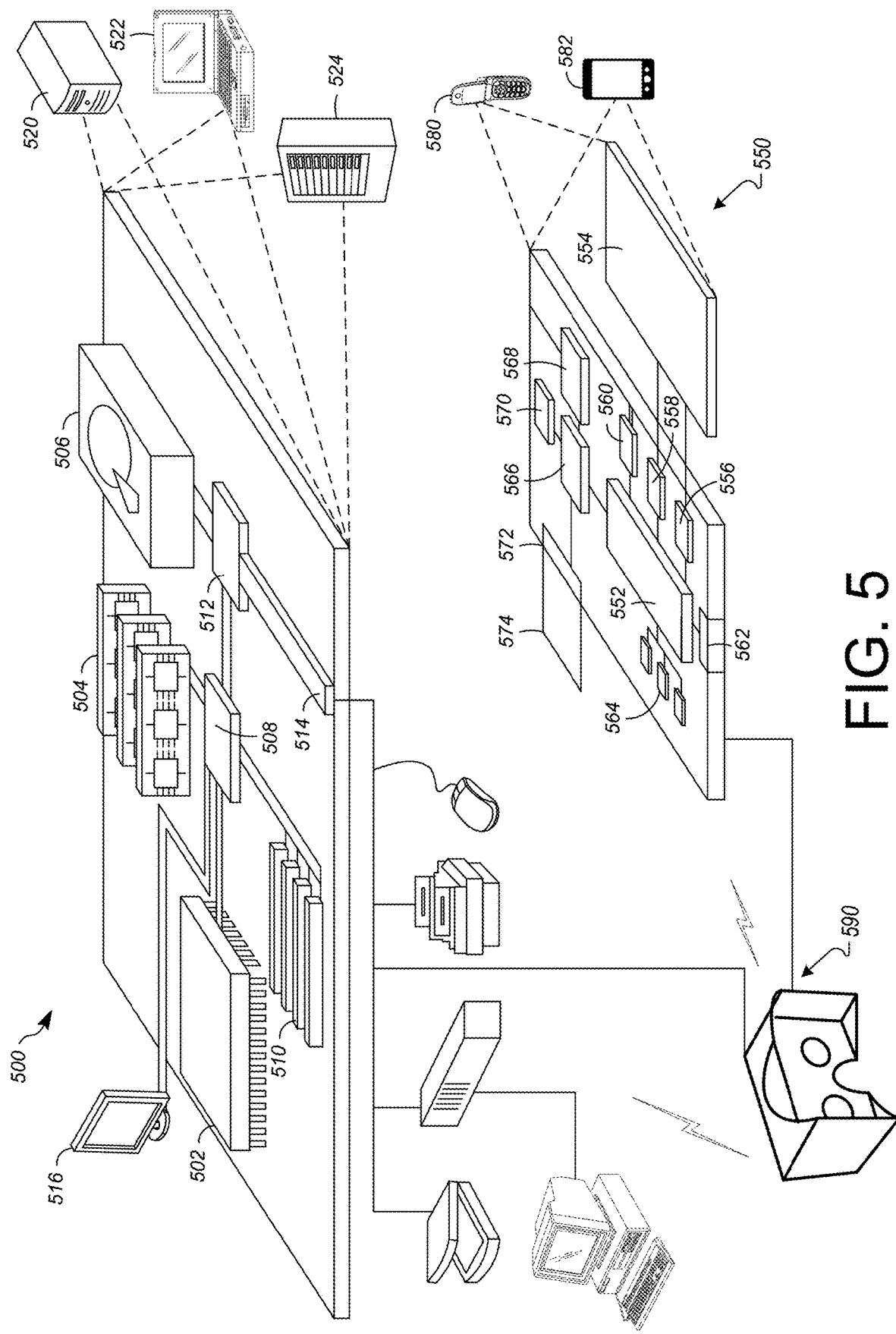
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. In addition, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MIMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 5 can include sensors that interface with a virtual reality (HMD device 590). For example, one or more sensors included on a computing device 550 or other computing device depicted in FIG. 5, can provide input to HMD device 590 or in general, provide input to a VR environment. The sensors can include, but are not limited to, a touchscreen, accelerometers, gyroscopes, pressure sensors, biometric sensors, temperature sensors, humidity sensors, and ambient light sensors. The computing device 550 can use the sensors to determine an absolute position and/or a detected rotation of the computing device in the VR environment that can then be used as input to the VR environment. For example, the computing device 550 may be incorporated into the VR environment as a virtual object, such as a controller, a laser pointer, a keyboard, a weapon, etc. Positioning of the computing device/virtual object by the user when incorporated into the VR environment can allow the user to position the computing device to view the virtual object in certain manners in the VR environment. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 550 can be used as input to the VR environment. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 550 when the computing device is incorporated into the VR environment can cause a particular action to occur in the VR environment.

In some implementations, a touchscreen of the computing device 550 can be rendered as a touchpad in VR environment. A user can interact with the touchscreen of the computing device 550. The interactions are rendered, in HMD device 590 for example, as movements on the rendered touchpad in the VR environment. The rendered movements can control objects in the VR environment.

In some implementations, one or more output devices included on the computing device 550 can provide output and/or feedback to a user of the HMD device 590 in the VR environment. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 550 may appear as another object in a computer-generated, 3D environment. Interactions by the user with the computing device 550 (e.g., rotating, shaking, touching a touchscreen, swiping a finger across a touch screen) can be interpreted as interactions with the object in the VR environment. In the example of the laser pointer in a VR environment, the computing device 550 appears as a virtual laser pointer in the computer-generated, 3D environment. As the user manipulates the computing device 550, the user in the VR environment sees movement of the laser pointer. The user receives feedback from interactions with the computing device 550 in the VR environment on the computing device 550 or on the HMD device 590.

In some implementations, a computing device 550 may include a touchscreen. For example, a user can interact with the touchscreen in a particular manner that can mimic what happens on the touchscreen with what happens in the VR environment. For example, a user may use a pinching-type motion to zoom content displayed on the touchscreen. This pinching-type motion on the touchscreen can cause information provided in the VR environment to be zoomed. In another example, the computing device may be rendered as a virtual book in a computer-generated, 3D environment.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR environment to control objects in the VR environment.

Computing device 500 is intended to represent varying forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

In the following, further examples of a computer-implemented method, a system, and a non-transitory computer readable medium according to the present disclosure are described.

A first example concerns a computer-implemented method comprising: receiving input for a virtual user in a virtual environment, the input being based on a plurality of movements performed by a user accessing the virtual environment; based on the plurality of movements, detecting that at least one portion of the virtual user is within a threshold distance of a collision zone, the collision zone associated with at least one virtual object; selecting a collision mode for the virtual user based on the at least one portion and the at least one virtual object; and dynamically modifying the virtual user based on the selected collision mode.

A second example concerns a computer-implemented method based on the first example further comprising adjusting the collision zone to align with the modified virtual user, the adjusting including providing, a plurality of viewable targets in the collision zone in which to receive the input, the plurality of viewable targets being associated with the selected collision mode.

In a third example based on the first or second example, a hover movement proximate to the at least one virtual object and the threshold distance includes about one half to about one inches from the at least one virtual object.

A fourth example concerns a computer-implemented method based on one of the first to third example further comprising determining that the virtual environment is providing scrollable content, selecting a palm-based collision mode, and configuring the content to be scrolled in response to receiving a palm gesture initiated by a hand of the user.

In a fifth example based on one of the first to fourth example, dynamically modifying the virtual user includes modifying a portion of the virtual user corresponding to providing input in the virtual environment.

In a sixth example based on the fifth example, modifying the portion further comprising: detecting that the input includes finger movements and the portion includes one or more virtual fingers; and extending a reach of the one or more virtual fingers into the collision zone, the extending including adapting the virtual user to interact with a virtual object that is shown proximate to the one or more virtual fingers in the virtual environment.

In a seventh example based on one of the first to sixth example, dynamically modifying the virtual user includes providing at least one of a visual response, an audio response, or a haptic response to the user.

An eighth example concerns a computer-implemented method based on one of the first to seventh example further comprising providing at least one context-sensitive collision zone based at least in part on the selected collision mode, wherein the collision mode is configured as a fine collision mode if the context of the collision zone is configured to receive finger gestures and wherein the collision mode is configured as a coarse collision mode if the context of the collision zone is configured to receive interactive hand gestures.

In a ninth example based on the eighth example, the context-sensitive collision zone is provided based on a size associated with the collision zone.

In a tenth example based on the eighth or ninth example, the context-sensitive collision zone is provided based on a size associated with the at least one virtual object in the virtual environment.

An eleventh example concerns a system comprising an electronic computing device generating a virtual reality experience in a virtual reality environment, the electronic computing device being portable within a physical space; a plurality of sensors in communication with the electronic computing device, the sensors configured to detect motion associated with a user accessing the electronic computing device within the physical space; and at least one processor configured to, detect a movement proximate to a virtual object in the virtual reality environment, the movement being performed by a physical user, the movement being represented in the virtual environment and associated with a body part of the physical user; in response to determining that the virtual object is configured to receive input in an area on the virtual object that is smaller than the body part, selecting a collision mode to modify a selection capability with the body part; displaying, on a representation of the body part in the virtual environment, the modified selection capability; and maintaining the selected collision mode until detecting movement associated with a different virtual object.

In a twelfth example based on the eleventh example, displaying, on a representation of the body part in the virtual environment, the modified selection capability includes configuring the body part to glow, vibrate, move, grow, or shrink, the display indicating to the physical user a mechanism in which to interact with the virtual object.

In a thirteenth example based on the eleventh or twelfth example, the virtual object is a keyboard, the body part is a hand, the collision mode is selected to shrink a fingertip area of the hand, and the representation of the body part includes an indicator on each finger.

In a fourteenth example based on one of the eleventh to thirteenth example, the collision mode is selected from the group consisting of a full hand mode, a whole arm mode, a finger mode, a whole body mode, and a keyboard mode, each mode including a fine and a coarse configuration.

A fifteenth example concerns a non-transitory computer readable medium containing instructions that, when executed by a processor of a computer system, cause the computer system to: receive input for a virtual user in a virtual environment, the input being based on a plurality of movements performed by a user accessing the virtual environment; based on the plurality of movements, detect that at least one portion of the virtual user is within a threshold distance of a collision zone, the collision zone associated with/defined on at least one virtual object; select a collision mode for the virtual user based on the at least one portion of the virtual user being within the threshold distance of the collision zone.

A sixteenth example concerns a non-transitory computer readable medium based on the fifteenth example further comprising adjusting the collision zone to align with the modified virtual user, the adjusting including providing, a plurality of viewable targets in the collision zone in which to receive the input, the plurality of viewable targets being associated with the selected collision mode.

In a seventeenth example based on the fifteenth or sixteenth example, the input includes a hover movement proximate to the at least one virtual object and the threshold distance includes about one half to about one inches from the at least one virtual object.

In an eighteenth example based on one of the fifteenth to seventeenth example, dynamically modifying the virtual user includes modifying a portion of the virtual user corresponding to providing input in the virtual environment.

In a nineteenth example based on the eighteenth example, dynamically modifying the virtual user further comprises: detecting that the input includes finger movements and the portion includes one or more virtual fingers; and extending a reach of the one or more virtual fingers into the collision zone, the extending including adapting the virtual user to interact with a virtual object that is shown proximate to the one or more virtual fingers in the virtual environment.

A twentieth example concerns a non-transitory computer readable medium based on one of the fifteenth to nineteenth example, further comprising providing at least one context-sensitive collision zone based at least in part on the selected collision mode, wherein the collision mode is configured as a fine collision mode if the context of the collision zone is configured to receive finger gestures and wherein the collision mode is configured as a coarse collision mode if the context of the collision zone is configured to receive interactive hand gestures.

What is claimed is:

1. A computer-implemented method comprising:
receiving input for a virtual user in a virtual environment, the input being based on a plurality of movements performed by a user accessing the virtual environment;
based on the plurality of movements, detect that a hand of the virtual user is within a threshold distance of a collision zone, the collision zone associated with at least one virtual object;
selecting a collision mode for the virtual user based on detecting the hand within the threshold distance of the at least one virtual object; and
dynamically modifying the hand of the virtual user based on the selected collision mode, wherein the virtual object is a keyboard and the collision mode is selected to shrink a fingertip area of the hand, and dynamically modifying the hand of the virtual user includes displaying an indicator on each finger.

2. The method of claim 1, further comprising adjusting the collision zone to align with the indicator on at least one finger, the adjusting including providing, a plurality of viewable targets in the collision zone in which to receive the input, the plurality of viewable targets being associated with the selected collision mode.

3. The method of claim 1, wherein the input includes a hover movement proximate to the at least one virtual object and the threshold distance includes about one half to about one inch from the at least one virtual object to the hand.

4. The method of claim 1, further comprising determining that the virtual environment is providing scrollable content, selecting a palm-based collision mode, and configuring the content to be scrolled in response to receiving a palm gesture initiated by the hand of the user.

5. The method of claim 1, wherein a finger associated with the hand is also modified based on the selected collision mode.

6. The method of claim 5, further comprising:
detecting that the input includes finger movements; and
extending a reach of the finger into the collision zone, the extending including adapting the virtual user to interact with a virtual object that is shown within a threshold distance to the finger in the virtual environment.

7. The method of claim 1, wherein the virtual user is further altered to provide at least one of a visual response, an audio response, or a haptic response to the user.

8. The method of claim 1, further comprising providing at least one context-sensitive collision zone based at least in part on the selected collision mode, wherein the collision mode is configured as a fine collision mode if the context of the collision zone is configured to receive finger gestures and wherein the collision mode is configured as a coarse collision mode if the context of the collision zone is configured to receive interactive hand gestures.

9. The method of claim 8, wherein the context-sensitive collision zone is provided based on a size associated with the collision zone.

10. The method of claim 8, wherein the context-sensitive collision zone is provided based on a size associated with the at least one virtual object in the virtual environment.

11. A system comprising:
an electronic computing device generating a virtual reality experience in a virtual reality environment, the electronic computing device being portable within a physical space;
a plurality of sensors in communication with the electronic computing device, the sensors configured to detect motion associated with a user accessing the electronic computing device within the physical space; and
at least one processor configured to,
detect a movement in the virtual reality environment, the movement being performed by a physical user, the movement being represented in the virtual environment and associated with a body part of the physical user;
in response to determining that a virtual object is configured to receive input in an area on the virtual object that is smaller than the body part, selecting a collision mode to modify a selection capability with the body part and to shrink a portion of a representation of the body part determined to perform the input in the virtual environment;
displaying, on the representation of the body part in the virtual environment, the modified selection capability; and
maintaining the selected collision mode until detecting movement associated with a different virtual object, wherein the virtual object is a keyboard, the body part is a hand, the collision mode is selected to shrink a fingertip area of the hand, and the representation of the body part includes an indicator on each finger.

12. The system of claim 11, wherein displaying, on a representation of the body part in the virtual environment, the modified selection capability includes configuring the body part to glow, vibrate, or move, the display indicating to the physical user a mechanism in which to interact with the virtual object.

13. The system of claim 11, wherein the collision mode is selected from the group consisting of a full hand mode, a whole arm mode, a finger mode, a whole body mode, and a keyboard mode, each mode including a fine and a coarse configuration.

14. A non-transitory computer readable medium containing instructions that, when executed by a processor of a computer system, cause the computer system to:
receive input for a virtual user in a virtual environment, the input being based on a plurality of movements performed by a user accessing the virtual environment;
based on the plurality of movements, detect that a body part of the virtual user is within a threshold distance of a collision zone, the collision zone associated with at least one virtual object; and
select a collision mode for the virtual user based on the body part and the at least one virtual object;
dynamically modify the body part of the virtual user based on the selected collision mode, wherein the virtual object is a keyboard, the body part is a hand, the collision mode is selected to shrink a fingertip area of the hand and dynamically modify the hand of the virtual user to display an indicator on each finger.

15. The non-transitory computer readable medium of claim 14, further comprising adjusting the collision zone to align with at least one indicator displayed on at least one finger the adjusting including providing, a plurality of viewable targets in the collision zone in which to receive the input, the plurality of viewable targets being associated with the selected collision mode.

16. The non-transitory computer readable medium of claim 14, wherein the input includes a hover movement associated with the body part and the threshold distance includes about one half to about one inches from the at least one virtual object to the body part.

17. The non-transitory computer readable medium of claim 14, wherein at least one finger is providing input in the virtual environment.

18. The non-transitory computer readable medium of claim 17, further comprising:
detecting that the input includes finger movements; and
extending a reach of the finger into the collision zone, the extending including adapting the virtual user to interact with a virtual object that is shown within a threshold distance to the at least one finger in the virtual environment.

19. The non-transitory computer readable medium of claim 14, further comprising providing at least one context-sensitive collision zone based at least in part on the selected collision mode, wherein the collision mode is configured as a fine collision mode if the context of the collision zone is configured to receive finger gestures and wherein the collision mode is configured as a coarse collision mode if the context of the collision zone is configured to receive interactive hand gestures.

* * * * *